United States Patent [19]

Reichle

[11] Patent Number: 5,331,794
[45] Date of Patent: Jul. 26, 1994

[54] MOWER SHIELD

[76] Inventor: Andrew L. Reichle, 50 Verdin Ct., Apt. D., Gahanna, Ohio 43230

[21] Appl. No.: 161,540

[22] Filed: Dec. 6, 1993

[51] Int. Cl.⁵ ............................................. A01D 34/18
[52] U.S. Cl. ..................................... 56/17.4; 56/320.1
[58] Field of Search .................. 56/17.4, 320.1, 320.2, 56/255, DIG. 20

[56] References Cited

U.S. PATENT DOCUMENTS 4,282,704  8/1981  Stevens ............................ 56/17.4 X Primary Examiner—Ramon S. Britts
Assistant Examiner—Pamela Anne O'Connor
Attorney, Agent, or Firm—Thomas S. Baker, Jr.

[57] ABSTRACT

A mower shield is provided for rear engine driven riding lawn mowers which shield includes a top panel having a rear portion, a central portion, and a front portion, and is positionable to overhang the leading edge of the deck by connection to at least one supporting element. More specifically, the supporting element suspends a section of the top panel over the deck such that its rear portion generally extends across the deck substantially in contact therewith, while a section of the top panel and the front portion are suspended beyond the leading edge of the deck. The air currents established by this mower shield cause such grass clippings as are expelled forwardly from beneath the deck to enter the chamber defined by the mower shield and be redirected downwardly, away from the operator. Flexible rear and front portions of the top panel permit clearing of debris, while transparent central and front portions of the top panel permit inspection and increase visibility of the cutting path.

20 Claims, 2 Drawing Sheets

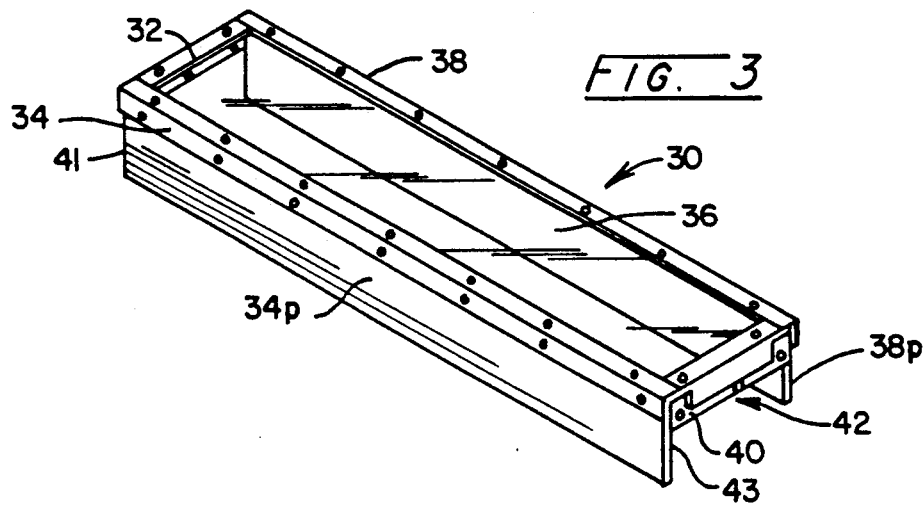
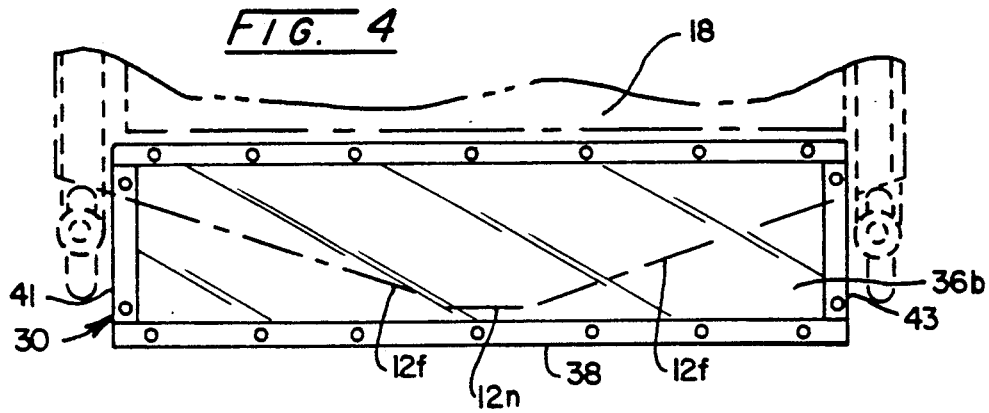
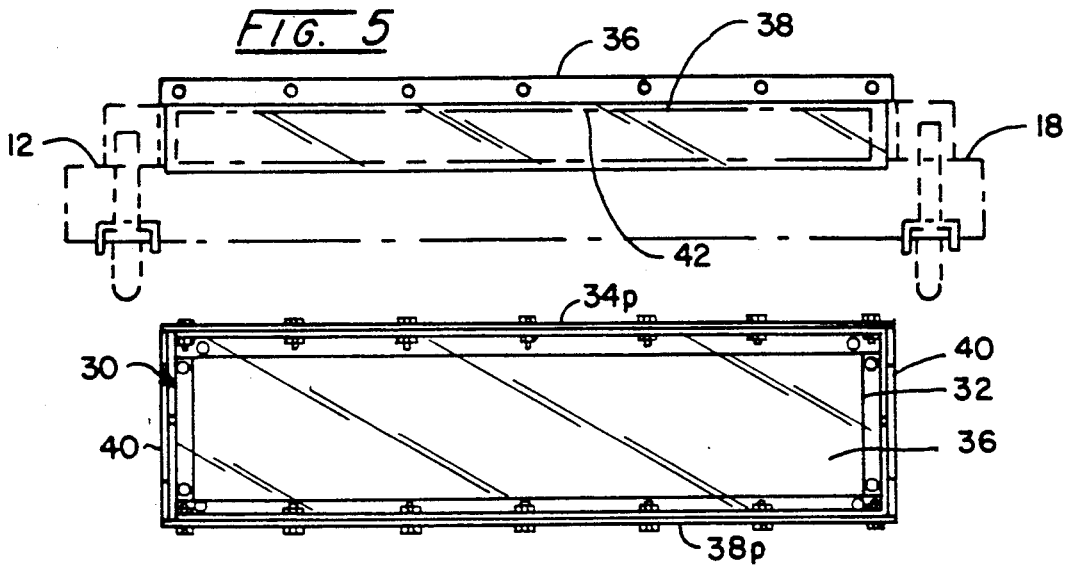
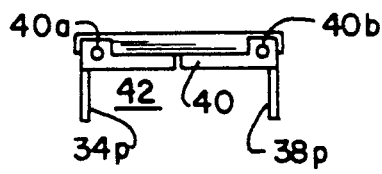

# MOWER SHIELD

BACKGROUND OF THE INVENTION

This invention relates to a shield which prevents grass expelled from the front of a mower from blowing rearwardly onto an operator.

Conventional rotating blade lawn mowers have motor driven blades encased in a deck or blade housing having a generally flat horizontal top surface and a substantially continuous vertical side wall which extends downwardly from the perimeter of the top surface. The blades typically are driven by a motor mounted above the deck directly through an output shaft extending from the motor or through a series of belts and pulleys which connect the output shaft to one or more shafts which mount one or more blades. Typically, the deck is supported on a wheeled frame structure such that the bottom edge of the side wall is spaced some distance above the grass during the mowing operation. The gap created by the space is necessary to prevent wet grass from accumulating in the blade space beneath the deck and to prevent the edge of the deck from catching or hitting obstacles such as tree roots, stumps, etc. During operation of the mower, grass typically is expelled outwardly through the gap between the bottom perimeter edge of the deck and the lawn.

In a motor driven rotating blade lawn mower which an operator walks behind, the motor ordinarily rests on top of the deck. Thus, it forms a barrier from grass which is expelled from the front of the mower and would tend to blow back over an operator as the operator moves the mower forwardly. In riding lawn mowers of the tractor type in which the drive motor projects in front of the operator and the operator sits above the blade deck the chassis and frame of the tractor prevent grass expelled from the bottom perimeter edge of the deck from blowing onto an operator.

In an effort to obtain greater mobility for lawn mowers which carry an operator, some manufacturers have abandoned the traditional front engine configuration in favor of a rear drive rear steering mower. In a rear drive mower, a deck or blade housing projects forwardly from the power and drive mechanism of the machine. A seat for the operator is mounted on the tractor in front of the engine and above the blade housing such that the operator's feet rest on the deck during operation of the vehicle. With this configuration, the operator has excellent visibility with respect to the front of the mower deck. Additionally, the rear steering feature provides improved maneuverability of the vehicle when compared with a vehicle having front steering wheels.

Although a rear drive vehicle provides many advantages over a front engine driven vehicle, it does suffer from one important disadvantage. Because the operator sits in front of the engine above the blade housing, grass which is expelled from beneath the portion of the gap beneath the bottom perimeter edge of the deck sidewall, blows rearwardly during the mowing operation and covers an operator's feet and legs. That is, the structure of such mowers which improves operator visibility and maneuverability, permitting the space between the operator and leading edge of the deck to be generally unobstructed, allows the grass expelled from the gap beneath the deck to make the operating environment uncomfortable.

Consequently, the need exists for a device which will prevent grass clippings which are expelled from the gap at the bottom of the front portion of a vehicle wall of a mower blade housing from blowing back on an operator of a rear engine driven mower, so that the advantages of rear engine drive designs may be achieved with operator comfort.

SUMMARY OF THE INVENTION

The present invention satisfies that need by providing a mower shield which is fitted to the front of a self-propelled rear engine driven lawn mower to prevent grass clippings from blowing back on the operator. The present invention may be retrofitted to existing equipment, or provided as an integral part of new equipment. The mower shield of the present invention defines a chamber which receives and redirects downwardly the grass clippings which otherwise reach the operator. In addition, the mower shield of the present invention enhances safe operation for both the operator and nearby personnel by projecting forward from the mower deck to provide an additional guard to inhibit entry of obstructions, particularly feet, into the rotating blades beneath the deck.

In accordance with the present invention, a mower shield is provided which includes a top panel having a rear portion, a central portion, and a front portion, and which is positioned to overhang the leading edge of the deck by connection to at least one supporting element. More specifically, the supporting element suspends a section of the top panel over the deck such that its rear portion generally extends across the deck substantially in contact therewith, while a section of the top panel including the front portion are suspended beyond the leading edge of the deck. The air currents established by this mower shield cause such grass clippings as are expelled forwardly from beneath the deck to enter the chamber defined by the mower shield and to be redirected downwardly and outwardly from each end of the shield, away from the operator.

In accordance with the present invention, it is preferred that the rear portion and front portion of the top panel comprise a separate, flexible rear flap and front flap, respectively, and that the central portion of the top panel and front flap be transparent to permit inspection and clearing of debris, as well as increase visibility of the cutting path.

Accordingly, the present invention enables rear engine driven lawn mowers to provide increased visibility and maneuverability while improving operator comfort.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 3 is a schematic perspective view of the mower shield of the present invention.

FIG. 4 is a plan view of the mower shield of FIG. 3.

FIG. 5 is a front elevational view of the mower shield of FIG. 3.

FIG. 6 is a bottom view of the mower shield of FIG. 3.

FIG. 7 is a side elevational view of the mower shield of FIG. 3.

DETAILED DESCRIPTION OF THE PREFERRED EMBODIMENTS

Figure 1:
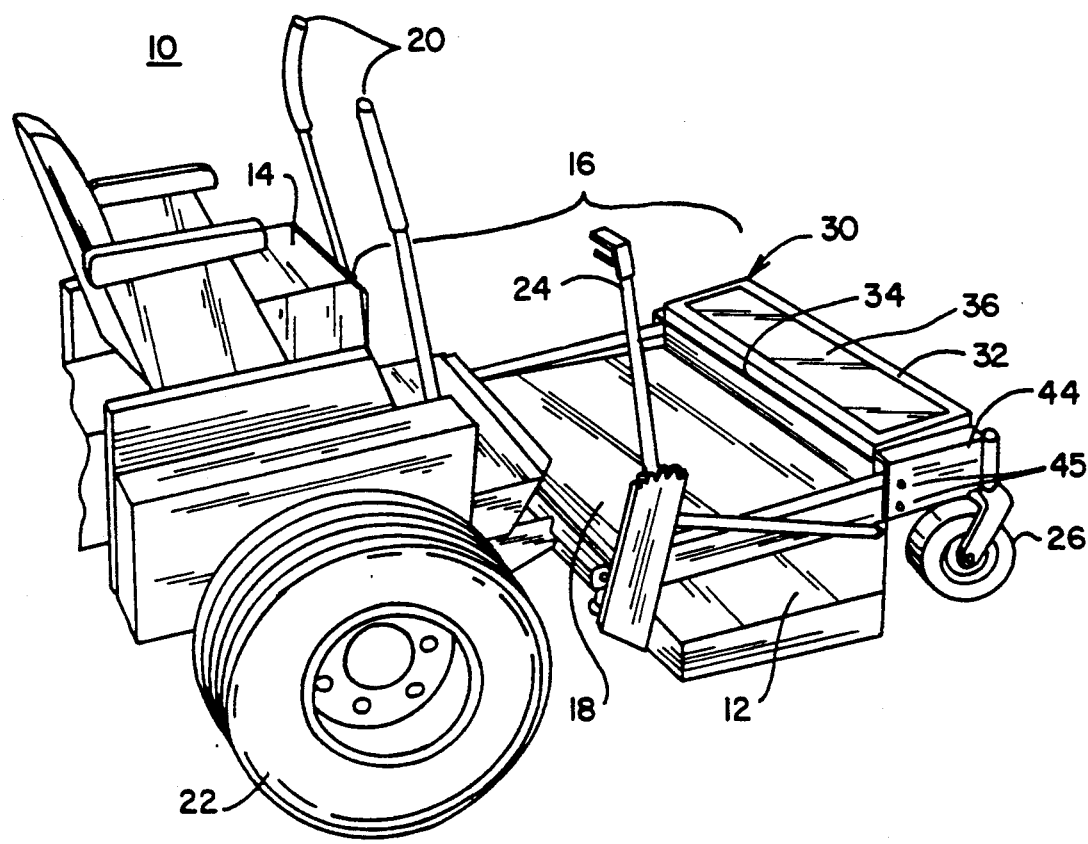
FIG. 1 is a schematic perspective view of a lawn mower including the mower shield of the present invention.

Referring to FIG. 1, a representative rear engine driven, self-propelled lawn mower (10) is shown including a deck (12) covering at least one rotating blade (not shown), and an operator platform, e.g. a seat (14), positioned in front of the engine (not shown). Such a configuration allows the space (16) between the seat (14) and the leading edge (12f) of the deck (12) to be generally unobstructed, providing enhanced visibility as well as greater maneuverability. It is understood that the seat (14) could be partially overhanging the deck (12), or be replaced by an operator platform for a standing or kneeling operator, and the engine could be at least partially disposed beneath the seat, without adverse effect on the advantages of such rear engine driven lawn mower designs. Deck (12), as shown, also further includes an upper deck housing (18) (shown best in FIG. 5) covering power transmission elements, e.g. pulleys, belts and gears (now shown), which transmit power from the engine to at least one rotating blade, as is known in the art. Other lawn mower parts illustratively shown include a representative steering mechanism (20) for alignment of tires (22) for steering, a deck height adjustment device (24), and deck support casters (26). A single pole steering mechanism, centrally located (not shown), may alternatively be provided, and absent additional structure, would present the operator with substantially the same problems with regard to grass clippings.

Still referring to FIG. 1, in accordance with the present invention, a mower shield (30) is provided which includes a top panel (32) having a rear portion (34), a central portion (36), a front portion (38), and an integral side support element (40) having a pair of bores (40a and 40b) at each side thereof and is positioned to overhang the leading edge (12f) of the deck (12) by connection of each side support element (40) to a support bracket (44) mounted on each side of the mower by bolts (45) (shown best in FIG. 1. More specifically, the support element (40) clamps to bracket (44) to thereby suspend a section of the top panel (32) over the deck (12) such that its rear portion (34) generally extends across the deck (12) substantially in contact therewith, as shown in FIG. 1, while a section of the top panel (32) and the front portion (38) are suspended beyond the leading edge (12f) of the deck, as best shown in FIG. 4. The air currents established by the mower (10) cause such grass clippings as are expelled forwardly from beneath the deck (12) to enter the chamber (42) defined beneath the mower shield (30) and to be redirected downwardly and outwardly from each end (41 and 43) of shield (30), away from the operator platform.

In accordance with the preferred embodiment of FIGS. 1-7, and as shown best in FIG. 3, the rear portion (34) and front portion (38) of the top panel (32) each comprise a separate, flexible rear flap (34p) and a separate, flexible front flap (38p), respectively, connected to the central portion (36) by conventional means. The rear flap (34p) may also be semi-rigid, or substantially rigid with a sealing edge, and generally perform as desired. The front flap (38p) is preferably fairly flexible to allow it to billow out slightly as may be desirable during use, and to facilitate access as may be needed for installation or clearing of debris. It is also desirable that at least one portion or panel, i.e. the rear portion (34) or panel (34p), central portion (36), or the front portion (38) or panel (38p), be transparent to permit inspection for cleaning of debris. Preferably, both the central portion (36) and front portion (38) of the top panel (32) are transparent, as variously indicated in FIGS. 1-6, to increase visibility of the cutting path.

While the preferred embodiment defines a generally rectangular, box-like chamber (42) to receive and deflect grass clippings, it is understood that the shape of the mower shield (30) could include a curved section (not shown), particularly the central portion (36), and could smoothly transition from a curved section into the rear or front portions (34, 38). As well, in some applications, the shape of the deck (12) may permit the rear portion (34) or rear flap (34p) to be shortened significantly, or comprise simply the rearward edge of the mower shield (30).

Figure 2:
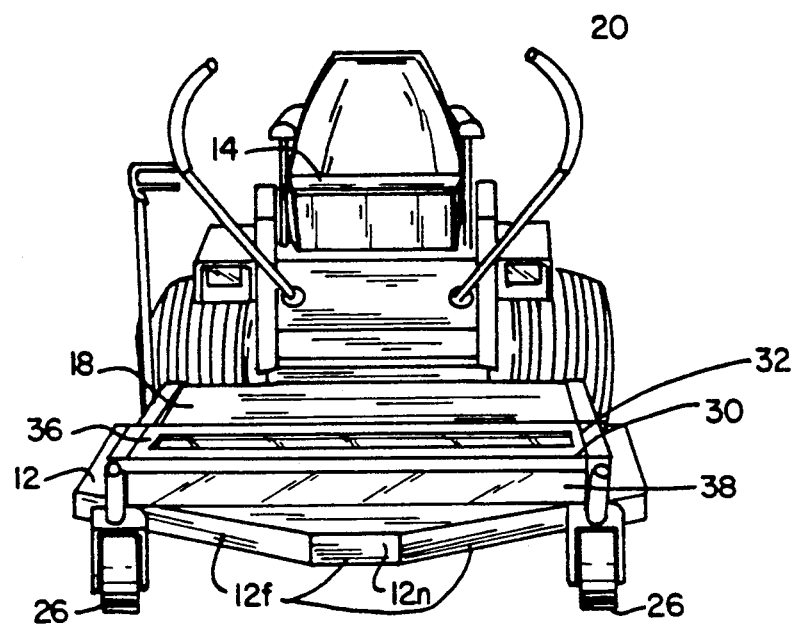
FIG. 2 is a front elevational view of the lawn mower of FIG. 1.

As illustratively shown in FIGS. 1, 2 and 5, the deck (12) shown permits the mower shield (30) to nest between mower structure, such that the support element (40) connects the top panel (32) to a pair of support brackets (44) mounted on the mower frame adjacent deck (12) by fastener (45).

In accordance with the present invention, by way of example and not limitation, for an approximately 50 inch wide mower deck (12) (e.g. 48 inch cutting width) having a leading edge (12f) including tapered portions and a forward nose portion (12n), as illustrated for one commercially available mower shown in FIG. 4, it has been found that the mower shield (30) operates well to inhibit clippings where an overhang of approximately two inches beyond the nose portion (12n) is provided (see FIG. 4), and where the central portion (36) of the top panel (32) is approximately 4 inches above the lowest surface of the deck (12) near the leading edge (12f) (see FIG. 5). In this application, the front flap (38p) is approximately six inches in width. Again, however, these dimensions are exemplary for the preferred, generally rectangular configuration, and there is no intention to limit the present invention thereto.

The present invention is designed to be used as a retrofit to existing equipment, as well as for use on new equipment. Accordingly, the mower shield (30) is preferably removable via fasteners (45). However, the support element (40) may also be welded to the support brackets (44) for more permanent installation. As well, to permit production of a generic shield which can be fitted or retrofitted to numerous mower models, the mower shield (30) may include support elements (40) which permit height adjustment, and the top panel (32) may be comprised of two or more slidable components which permit extension in length or width of the mower shield, and which may be locked in position by fasteners once the desired dimensions are achieved.

All materials are conventional materials used in the production of lawn maintenance equipment. For example, for durability, the mower shield (30) may be comprised of a metal frame with a hard transparent plastic central portion (36), transparent, flexible plastic front flap (38p), and flexible hard rubber or plastic rear flap (34p).

In describing the preferred embodiment of the present invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

While certain representative embodiments and details have been shown for purposes of illustrating the invention, it will be apparent to those skilled in the art that various changes in the device shown herein may be made without departing from the scope of the invention, which is defined in the appended claims.

Since certain changes may be made in the above-described system and apparatus not departing from the scope of the invention herein and above, it is intended that all matter contained in the description or shown in the accompanying drawings shall be interpreted as illustrative and not in a limiting sense.

I claim my invention as follows:

1. A mower shield adapted to be attached to a self-propelled lawn mower having a mower frame, a deck mounted in said frame and covering at least one rotating blade, said deck having a leading edge and a trailing edge, and an operator platform positioned rearward from said leading edge, positioned such that the space between said operator platform and said leading edge is generally unobstructed which comprises:
    a top panel having a rear portion, a central portion, and a front portion defining a chamber;
    at least one supporting element connecting said top panel to said deck;
    wherein said at least one supporting element:
    positions a section of said top panel over said deck such that said rear portion generally extends across said deck substantially in contact therewith; and
    suspends a section of said top panel and said front portion beyond the leading edge of said deck; and wherein
    at least part of said top panel of said mower is transparent;
    whereby such grass clippings as are expelled forwardly from beneath said deck and travel upward and rearward over said deck, in greatest part enter said chamber and are redirected downwardly thereby, away from said operator platform.

2. The mower shield of claim 1 wherein said mower shield is removable.

3. The mower shield of claim 1 wherein said at least one supporting element connects said top panel to said deck.

4. The mower shield of claim 3 wherein said at least one supporting element comprises:
    a pair of side support elements, one each extending downward from opposite sides of said top panel; and
    fasteners securing said side support elements to said mower frame.

5. The mower shield of claim 1 wherein said rear portion of said top panel comprises a separate rear flap connected to said central portion.

6. The mower shield of claim 5 wherein said rear flap is flexible.

7. The mower shield of claim 1 wherein said front portion of said top panel comprises a separate front flap connected to said central portion.

8. The mower shield of claim 7 wherein said front flap is flexible.

9. The mower shield of claim 7 wherein said front flap is transparent.

10. The mower shield of claim 1 wherein:
    said front portion of said top panel comprises a separate front flap connected to said central portion; and
    said rear portion of said top panel comprises a separate rear flap connected to said central portion.

11. The mower shield of claim 1 wherein:
    said operator platform comprises a seat positioned higher than said deck;
    at least a part of said top panel of said mower shield is transparent; and
    said front portion of said top panel comprises a separate, flexible front flap connection to said central portion.

12. The mower shield of claim 11 wherein said rear portion of said top panel comprises a separate, flexible rear flap connected to said central portion.

13. The mower shield of claim 1 wherein said mower shield is adjustable in height.

14. The mower shield of claim 1 wherein said mower shield is comprised of two or more components adjustably positionable to vary the size of said top panel in at least one dimension.

15. The mower shield of claim 1 wherein said operator platform comprises a seat positioned higher than said deck.

16. The mower shield of claim 15 wherein said seat is further positioned behind the trailing edge of said deck.

17. The mower shield of claim 15 wherein said lawn mower parts further include a steering mechanism at least a portion of which is positioned forward of said seat, said steering mechanism configured such that said space between said seat and said leading edge of said deck remains generally unobstructed.

18. The mower shield of claim 1 defining a pair of opposite ends wherein each of said ends has an opening beneath a side support element through which grass clippings may be expelled from said chamber.

19. In a self-propelled, riding lawn mower, including:
    a deck covering at least one rotating blade, said deck having a leading edge and a trailing edge, and a skirt extending downward from at least a portion of said deck;
    an operator seat positioned higher than said deck and rearward from the leading edge thereof, and said operator seat positioned such that said space between said operator seat and said leading edge of said deck is substantially unobstructed; an improvement comprising
    a removable mower shield comprising:
    a top panel;
    a flexible rear flap connected to said top panel;
    a flexible front flap connected to said top panel and spaced from said rear flap; and
    supporting elements connecting said mower shield to said deck, wherein said supporting elements:
    position a portion of said top panel over said deck such that said rear flap generally extends across said deck substantially in contact therewith; and
    suspend a portion of said top panel and said flexible front flap beyond the leading edge of said deck; and
    wherein at least part of said top panel of said mower is transparent;
    whereby a substantial portion of such grass clippings as are expelled forwardly from beneath said deck and travel upward over said deck, enter said mower shield and are redirected downwardly thereby.

20. The lawn mower of claim 19 wherein at least one of said top panel, front flap, and rear flap are transparent.

* * * * *